(12) United States Patent
Granade et al.

(10) Patent No.: US 11,010,450 B2
(45) Date of Patent: May 18, 2021

(54) USING RANDOM WALKS FOR ITERATIVE PHASE ESTIMATION

(71) Applicant: Microsoft Technology Licensing, LLC, Redmond, WA (US)

(72) Inventors: Christopher Granade, Redmond, WA (US); Nathan O. Wiebe, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/023,942

(22) Filed: Jun. 29, 2018

(65) Prior Publication Data

US 2019/0179871 A1 Jun. 13, 2019

Related U.S. Application Data

(60) Provisional application No. 62/596,609, filed on Dec. 8, 2017.

(51) Int. Cl.
| | | |
|---|---|---|
| *G06F 17/16* | (2006.01) | |
| *G06N 10/00* | (2019.01) | |
| *G06N 5/00* | (2006.01) | |
| *G06N 7/00* | (2006.01) | |

(52) U.S. Cl.
CPC ............ *G06F 17/16* (2013.01); *G06N 5/003* (2013.01); *G06N 7/005* (2013.01); *G06N 10/00* (2019.01)

(58) Field of Classification Search
None
See application file for complete search history.

(56) References Cited

U.S. PATENT DOCUMENTS

| | | | |
|---|---|---|---|
| 9,275,011 B2 | 3/2016 | Svore et al. | |
| 2006/0224547 A1* | 10/2006 | Ulyanov | G06N 10/00 706/62 |
| 2007/0250280 A1* | 10/2007 | Beausoleil | G06N 10/00 702/79 |

(Continued)

FOREIGN PATENT DOCUMENTS

WO WO 2017/116446 7/2017

OTHER PUBLICATIONS

Granade et al., "Qinfer: Statistical inference software for quantum applications," arXiv:1610.00336v2, pp. 1-19 (Apr. 2017).

(Continued)

*Primary Examiner* — Michael D. Yaary
(74) *Attorney, Agent, or Firm* — Klarquist Sparkman, LLP

(57) ABSTRACT

The disclosed technology concerns example embodiments for estimating eigenvalues of quantum operations using a quantum computer. Such estimations are useful in performing Shor's algorithm for factoring, quantum simulation, quantum machine learning, and other various quantum computing applications. Existing approaches to phase estimation are sub-optimal, difficult to program, require prohibitive classical computing, and/or require too much classical or quantum memory to be run on existing devices. Embodiments of the disclosed approach address one or more (e.g., all) of these drawbacks. Certain examples work by using a random walk for the estimate of the eigenvalue that (e.g., only) keeps track of the current estimate and the measurement record that it observed to reach that point.

19 Claims, 14 Drawing Sheets

(56) References Cited

U.S. PATENT DOCUMENTS

| | | | | |
|---|---|---|---|---|
| 2008/0116448 A1* | 5/2008 | Kitaev | ............... | G06N 10/00 257/30 |
| 2012/0071333 A1* | 3/2012 | Kauffman | ............ | B82Y 10/00 506/8 |

OTHER PUBLICATIONS

International Search Report and Written Opinion dated Mar. 8, 2019, from International Patent Application No. PCT/US2018/063496, 19 pp.
Paesani et al., "Experimental Bayesian Quantum Phase Estimation on a Silicon Photonic Chip," arXiv:1703.05169v1, pp. 1-15 (Mar. 2017).
Wiebe et al., "Approximate Bayesian Inference via Rejection Filtering," arXiv:1511.06458v2, pp. 1-16 (Dec. 2015).
Aspuru-Guzik et al., "Simulated Quantum Computation of Molecular Energies," *Journal of Science*, vol. 309, pp. 1704-1707 (Sep. 2005).
Bonato et al., "Adaptive tracking of a time-varying field with a quantum sensor," *Physical Review A*, vol. 95, pp. 1-11 (May 2017).
Brassard et al., "Quantum Amplitude Amplification and Estimation," *Proc. Contemporary Mathematics*, vol. 305, pp. 1-32 (May 2000).
Casagrande, "On Design and Testing of a Spectrometer Based on an FPGA Development Board for use with Optimal Control Theory and High-Q Resonators," Thesis, University of Waterloo, pp. 1-57 (Feb. 2014).
Ferrie, "High posterior density ellipsoids of quantum states," *New Journal of Physics*, vol. 16, pp. 1-15 (Feb. 2014).
Ferrie et al., "How to best sample a periodic probability distribution, or on the accuracy of Hamiltonian finding strategies," *Quantum Information Processing*, vol. 12, pp. 1-8 (Jan. 2013).
Goodman, "A Dirty Dozen: Twelve P-Value Misconceptions," *Elsevier Seminars in Hematology*, vol. 45, pp. 135-140 (Jul. 2008).
Granade et al., "Robust online Hamiltonian learning," *New Journal of Physics*, vol. 14, pp. 1-31 (Oct. 2012).
Harrow et al., "Quantum algorithm for linear systems of equations," *Physical Review Letters*, vol. 103, pp. 1-24 (Jun. 2009).
Haykin, "Kalman Filtering and Neural Networks," John Wiley & Sons, pp. 1-298 (Oct. 2001).
Higgins et al., "Entanglement-free Heisenberg-limited phase estimation," *Journal of Nature*, vol. 450, pp. 1-6 (Nov. 2007).
Hoekstra et al., "Robust misinterpretation of confidence intervals," *Psychonomic Bulletin & Review*, pp. 1-8 (Jan. 2014).
Hornibrook et al., "Cryogenic Control Architecture for Large-Scale Quantum Computing," *Physical Review Applied*, vol. 3, pp. 1-9 (Feb. 2015).
Isard et al., "Condensation—Conditional Density Propagation for Visual Tracking," *Int'l Journal of Computer Vision*, vol. 29, pp. 5-28 (Aug. 1998).
Kapoor et al., "Fast Low-Memory Methods for Bayesian Inference, Gibbs Sampling and Deep Learning," U.S. Appl. No. 62/171,195, filed Jun. 4, 2015, 33 pp.
Kitaev et al., "Classical and Quantum Computation," *American Mathematical Society*, vol. 47, pp. 1-24 (May 2002).
Kitaev, "Quantum measurements and the Abelian Stabilizer Problem," arXiv:quant-ph/9511026, pp. 1-22 (Nov. 1995).
Lanyon et al., "Towards quantum chemistry on a quantum computer," *Nature Chemistry*, vol. 2, pp. 1-6 (Jan. 2010).
McClean et al., "Exploiting locality in quantum computation for quantum chemistry," *Physical Chemistry Letters*, vol. 5, pp. 1-14 (Dec. 2014).
Opper, "A Bayesian Approach to Online Learning," *Journal of Online Learning in Neural Networks*, vol. 363, pp. 1-16 (Apr. 1998).
Peruzzo et al., "A variational eigenvalue solver on a quantum processor," *Journal of Nature Communications*, vol. 5, pp. 1-10 (Jul. 2014).
Shor, "Polynomial-Time Algorithms for Prime Factorization and Discrete Logarithms on a Quantum Computer," *SIAM J. Comput.*, vol. 26, No. 5, pp. 1484-1509 (Oct. 1997).
Shulman et al., "Suppressing qubit dephasing using real-time Hamiltonian estimation," *Nature Communications*, vol. 5, pp. 1-6 (Oct. 2014).
Svore et al., "Faster Phase Estimation," *Quantum Information & Computation*, vol. 14, pp. 1-14 (Mar. 2014).
Wecker et al., "Towards Practical Quantum Variational Algorithms," arXiv:1507.08969v2, pp. 1-11 (Sep. 2015).
Wiebe et al., "Efficient Bayesian Phase Estimation," *Physical Review Letters*, vol. 11, pp. 1-12 (Jun. 2016).
Wiebe et al., "Hamiltonian Learning and Certification Using Quantum Resources," *Physical Review Letters*, vol. 112, pp. 1-16 (May 2014).
Wiebe et al., "Quantum Bootstrapping via Compressed Quantum Hamiltonian Learning," *New Journal of Physics*, vol. 17, pp. 1-17 (Feb. 2015).
Wiebe et al., "Quantum Hamiltonian Learning Using Imperfect Quantum Resources," *Physical Review*, vol. 89, pp. 1-18 (Apr. 2014).

\* cited by examiner

USING RANDOM WALKS FOR ITERATIVE PHASE ESTIMATION

CROSS-REFERENCE TO RELATED APPLICATIONS

This application claims the benefit of U.S. Provisional Application No. 62/596,609 entitled "USING RANDOM WALKS FOR ITERATIVE PHASE ESTIMATION" and filed on Dec. 8, 2017, which is hereby incorporated herein by reference in its entirety.

FIELD

The disclosed technology concerns example embodiments for estimating eigenvalues of quantum operations using a quantum computer.

SUMMARY

The disclosed technology concerns example embodiments for estimating eigenvalues of quantum operations using a quantum computer. Such estimations are useful in performing Shor's algorithm for factoring, quantum simulation, quantum machine learning, and other various quantum computing applications. Existing approaches to phase estimation are sub-optimal, difficult to program, require prohibitive classical computing, and/or require too much classical or quantum memory to be run on existing devices. Embodiments of the disclosed approach address one or more (e.g., all) of these drawbacks. Certain examples work by using a random walk for the estimate of the eigenvalue that (e.g., only) keeps track of the current estimate and the measurement record that it observed to reach that point. Example embodiments further provide near optimal scaling, run within less than 300 bits of memory, and/or can execute within hundreds of nanoseconds on existing classical hardware.

In some embodiments, an iterative Heisenberg-limited phase estimation technique is performed in which the phase estimation is performed by a classical computer that is configured to cooperatively control a quantum computing device. Further, in this embodiment, the phase estimation technique involves deterministically and adaptively choosing experiments while using a concise set of statistics to represent its current one or more estimates and/or uncertainties about the unknown phase. For example, in some implementations, the phase estimation technique is deterministically generated by choosing parameters (e.g., for a random walk approach) that yield optimal information under the assumption of a Gaussian prior. Further, in other implementations, the experimental parameters include the number of times the unitary operation is applied and/or other experimental parameters, based on (for example) the direction of each step in the algorithm is determined by data and prior experiments. In particular implementations the phase estimation technique is deterministically generated by choosing parameters that yield optimal information under the assumption of a Gaussian prior. In some implementations, the iterative phase estimation technique comprises: applying a phase to a qubit register of a quantum computing device; estimating the phase of the qubit register; and adjusting a future measurement of the phase of the qubit register based on the phase estimation performed by the classical computer. Additionally, in some implementations, the phase estimation technique is performed to determine eigenvalues of a unitary operator represented by a qubit of the quantum computing device. And, in certain implementations, the phase estimation technique uses a random walk approach. The random walk approach can, for example, adjust a posterior mean of the phase estimation right or left based on a single measurement of the qubit register, and/or can adjust a posterior mean of the phase estimation upward or downward based on a single measurement of the qubit register.

In further embodiments, a phase estimation technique is performed by a classical computer; and a state of at least one qubit of a quantum computing device is measured based on results from the phase estimation technique. For example, the classical computer can be configured to cooperatively control the quantum computing device and generate a phase estimation using a random walk technique. In some example implementations, a decision to adjust a posterior mean of the phase estimation is adjusted left or right based on a single experiment and/or a posterior mean of the phase estimation is adjusted up or down based on a single experiment.

Further, in some implementations, the classical processing is performed by cryogenic hardware.

In some embodiments, a phase estimation technique is performed by a classical computer, and a state of at least one qubit of a quantum computing device is measured based on results from the phase estimation technique. In the illustrated embodiment, the classical computer is configured to cooperatively control a quantum computing device and perform the measurement. Still further, in the illustrated embodiment, the phase estimation is generated using a technique without random number generation (e.g., a non-random technique). In particular implementations, the phase estimation technique only stores a current best estimate of an eigenphase. Further, in some implementations, the classical processing is performed by cryogenic hardware.

In further embodiments, a phase estimation technique is performed by a classical computer; and a state of at least one qubit of a quantum computing device is measured based on results from the phase estimation technique. For example, the classical computer can be configured to cooperatively control the quantum computing device and perform the measurement. Additionally, in these embodiments, the phase estimation technique is a random walk technique and includes an unwinding procedure that step backs a current phase estimate based on receiving inconsistent data from an experiment. In particular implementations, the unwinding procedure reduces a mean error by restarting the procedure while retaining some information from at least one previous application of the method and/or using majority voting over different random answers. Further, in some implementations, the unwinding step causes the random walk technique to return to a location before a first datum was taken.

The foregoing and other objects, features, and advantages of the disclosed technology will become more apparent from the following detailed description, which proceeds with reference to the accompanying figures.

DETAILED DESCRIPTION

I. General Considerations

Figure 1:
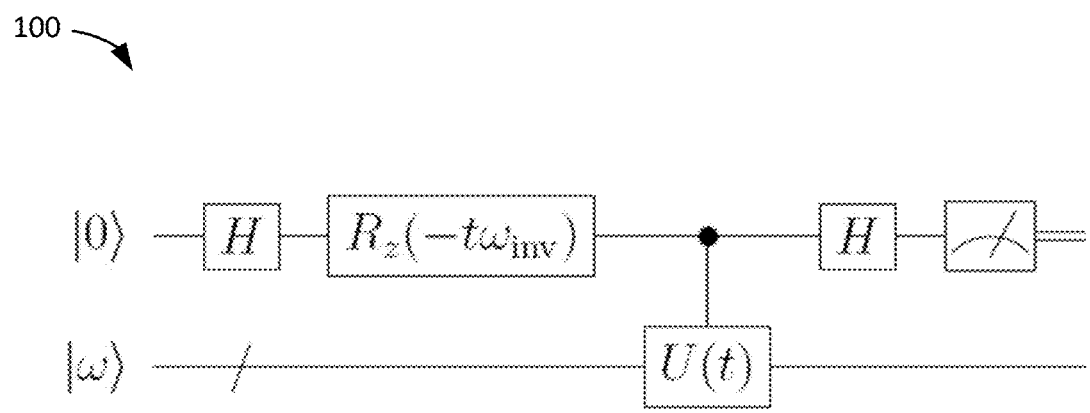
FIG. 1 is a schematic block diagram illustrating a circuit for measuring a single datum in an iterative phase estimation process.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. Introduction

Phase estimation is widely used throughout quantum information to learn the eigenvalues of unitary operators. This is a highly useful step in realizing computational speedups in areas such as applications that use Shor's algorithm, machine learning, quantum simulation, and many other diverse quantum computing applications. Moreover, the eigenvalues of unitary operators can carry information about physical parameters, such that phase estimation is useful in quantum metrology applications as well.

One approach to minimizing the quantum resources required for phase estimation is iterative phase estimation, in which one repeatedly uses the unitary of interest to write a phase onto a single-qubit register, and then processes the data collected from these measurements using classical resources. The data obtained from each iteration can then be used to determine the next measurement to perform, such that classically adaptive protocols are naturally expressed in the iterative phase estimation framework. Across applications for phase estimation, there is a benefit to formulating approaches to iterative phase estimation that allow for adaptivity and data processing with very modest classical resources.

In this disclosure, example embodiments that greatly reduce the memory resources needed for performing phase estimation, reduces the power requirements for performing phase estimation, and/or provide other computing improvements are presented. For instance, certain embodiments provide a new technique that uses approximately 250 bits of classical memory between iterations and that is entirely deterministic conditioned on the experimental data record. Other proposed approaches require significantly higher memory requirements. Several of the disclosed embodiments (including Algorithm 1 and Algorithm 2 below) are uniquely well-suited not only for implementation on FPGAs, but also on an application-specific integrated circuit (ASIC) or on tightly memory-bound microcontroller platforms. This in turn significantly reduces the cost required for implementing quantum algorithms and new metrology protocols such as distributed sensors Concretely, consider a family of unitary operators $U(t)$ for a real parameter $t$ and a quantum state $|\omega\rangle$ such that for all $t$ $U(t)|\omega\rangle = e^{i\omega t}|\omega\rangle$ for an unknown real number $\omega$. Now consider performing controlled applications of $U(t)$ on a copy of the state $|\omega\rangle$ in order to learn $\omega$.

There are many ways that the learning problem for phase estimation can be formalized. While the most commonly used methods have historically estimated the phase in a bit-by-bit fashion, Bayesian approaches to learning $\omega$ have recently gained in popularity because of their robustness and their statistical efficiency. The idea behind such methods is to quantify the uncertainty in $\omega$ via a prior probability distribution, $Pr(\omega)$. Then conditioned on measuring an outcome $d$ the probability distribution describing the uncertainty in $\omega$ conditioned on the measurement is $$Pr(\omega | d) = \frac{Pr(d | \omega)Pr(\omega)}{Pr(d)}, \quad (1)$$

where $Pr(d)$ is a normalization factor and $Pr(d|\omega)$ is the likelihood of the experiment reproducing the observation $d$ given that the phase $\omega t$ was the true eigenphase of $U(t)$.

The art of Bayesian phase estimation is then to choose experiments in such a way to minimize the resources needed to reduce the uncertainty in an estimate of $\omega$, given by the estimator $\hat{\omega}$. Adaptive versions of Bayesian phase estimation are known to achieve Heisenberg limited scaling and come close to saturating lower bounds on the uncertainty in $\omega$ as a function of experimental time or number of measurements. A complication that arises in choosing a Bayesian method is that each such a method requires different amounts of experimental time, total number of measurements, classical memory and processing time and robustness to experimental imperfections. The latter two can be of concern in present-day applications where any form of Bayesian inference that requires classical processing time that is comparable to the coherence time (which is often on the order of microseconds). To this end, finding simple phase estimation methods that are robust, efficient, and can be executed within a timescale of hundreds of nanoseconds are desirable.

In this disclosure, the primary focus is on the general case of phase estimation with continuous-time families of unitary operators U(t), rather than the discrete-time case of $U(M\delta t)=V^M$ for some time fixed unitary operator V, time interval $\delta t$ and positive integer M. As the more general case is considered, it is not assumed that $\omega \in [0, 2\pi)$. This implies that one can assign as a loss function $L(\omega, \hat{\omega}):=(\omega-\hat{\omega})^2$. That is, an estimate $\hat{\omega}$ is penalized by its squared error from the true eigenphase $\omega$.

III. Example Random Walk Technique

A notable difference between embodiments of the disclosed approach and most other Bayesian methods that have been proposed is that embodiments of the disclosed technology are entirely deterministic. Specifically, the posterior mean (which is used in certain embodiments as the estimate of the true eigenphase) shifts left or right upon collection of each datum by a fixed amount that depends only on the experimental outcome. Thus, the trajectory that the estimate of the eigenphase takes as the experiment proceeds follows a random walk with an exponentially shrinking stepsize. This simplicity allows one to not only store an approximation to the posterior distribution using very, very little memory; it also only uses basic arithmetic that can be performed within the coherence times of modern quantum devices.

The fundamental experimental template that is used certain embodiments of the disclosed technology is given by FIG. 1. FIG. 1 is a schematic block diagram 100 illustrating a circuit for measuring a single datum in an iterative phase estimation process. Computing the probability of observing $d \in \{0, 1\}$ as an outcome in the circuit shown in FIG. 1 gives the likelihood function for phase estimation.

$$Pr(d|\omega;t,\omega_{inv})=\cos^2(t[\omega-\omega_{inv}]/2+d\pi/2). \quad (2)$$

Equipped with a likelihood function, one can thus reason about the posterior probability $Pr(\omega|d)$ for a datum d by using Bayesian inference.

Rather than performing exact Bayesian inference, which is not efficient because the memory required grows exponentially with the number of bits of precision needed, embodiments of the disclosed technology use a form of approximate Bayesian inference. In particular, in one example embodiment, it is assumed that the prior distribution is Gaussian at each step:

$$Pr(\omega) = \frac{\exp(-(\omega-\mu)^2/2\sigma^2)}{\sqrt{2\pi}\,\sigma}. \quad (3)$$

Such priors can be efficiently represented because they are only a function of $\mu$ and $\sigma$. Unfortunately, the conjugate priors for (2) are not Gaussian which means that the posterior distribution is not. Gaussian:

$$Pr(\omega \mid d; t, \omega_{inv}) = \quad (4)$$

$$\frac{\cos^2(t[\omega-\omega_{inv}]/2+d\pi/2)\exp(-(\omega-\mu)^2/2\sigma^2)}{\int_{-\infty}^{\infty}\cos^2(t[\omega-\omega_{inv}]/2+d\pi/2)\exp(-(\omega-\mu)^2/2\sigma^2)d\omega}.$$

However, for most experiments that are considered, the posterior distribution will be unimodal and thus the majority of the probability mass will be given by the first two moments of the distribution. This justifies the following approximation, $$Pr(\omega \mid d; t, \omega_{inv}) \approx \frac{\exp(-(\omega-\mu')^2/2\sigma'^2)}{\sqrt{2\pi}\,\sigma'}, \quad (5)$$

where $\mu'$ and $\sigma'$ are chosen to match the posterior mean and posterior standard deviation (where, as will be recognized by those skilled in the art, the standard deviation reflects the uncertainty). Specifically, $$\mu':=\mathbb{E}[\omega]=\int_{-\infty}^{\infty}\omega P(d|\omega;t,\omega_{inv})d\omega$$

and similarly $$\sigma'^2:=\mathbb{V}[\omega]=\int_{-\infty}^{\infty}\omega^2 P(d|\omega;t;\omega_{inv})d\omega-\mu'^2.$$

Here, one can take as an approximation that the prior distribution $Pr(\omega)$ is a Gaussian distribution at each step, and thus the prior can be characterized by its mean $\mu_0:=\mathbb{E}[\omega]$ and variance $\sigma_0^2:\mathbb{V}[\omega]$. The Bayes update then consists of finding the updated mean $\mu=\mathbb{E}[\omega|d]=\int \omega Pr(w|d)d\omega$ and updated variance $\sigma^2=\mathbb{V}[\omega|d]=\int \omega Pr(w|d)d\omega-\mu^2$, which one can then use as the prior distribution at the next step. For the phase estimation likelihood and under the assumption of prior Gaussianity, one can do this explicitly. In calculating the update, it can be assumed without loss of generality that under the prior, $\mu_0=0$ and $\sigma_0^2=1$: the general case is obtained from this case by the standard location-scale transformation. The update rule can be expressed explicitly without the use of rescaling at the end of the derivation. Then, the rescaled update rule is given by $$\mu' \leftarrow \frac{(t\sin[t\omega_{inv}])}{se^{t^2/2}+\cos[t\omega_{inv}])} \quad (6a)$$

and $$\sigma'^2 \leftarrow 1-st^2\left[\frac{e^{t^2/2}\cos(t\omega_{inv})+s}{(e^{t^2/2}+s\cos(t\omega_{inv}))^2}\right], \quad (6b)$$

where $s=(-1)^d$.

Since the posterior variance describes the error that one should expect to be incurred in estimating $\omega$ with the currently available observations, one can then choose t and $\omega_{inv}$ to minimize the posterior variance and hence minimize the errors that are incurred. The posterior variance is mini mized for both d=0, 1 at t=$\sigma^{-1}$ and $\omega_{inv}$=$\mu$, such that one can specialize (6) at these values to obtain a simpler update rule, $$\mu' \leftarrow \mu + (-1)^d \frac{\sigma}{\sqrt{e}} \qquad (7a)$$

$$\sigma' \leftarrow \sigma \sqrt{\frac{e-1}{e}} \qquad (7b)$$

In this way, one can derive the particle guess heuristic (PGH) [?] for the special case of phase estimation with a Gaussian conjugate prior.

Notably, the variance update in (7) does not depend on which datum is observed; the reduction in variance at each step is wholly deterministic. Similarly, the mean shifts by the same amount at each step, such that the only dependence on the data of the Gaussian approximation to the posterior distribution is through which direction the mean shifts at each observation. One can thus think of the Gaussian approximation as yielding a random walk that is damped towards the true value of $\omega$. Following this identification, one can obtain Algorithm 1.

Algorithm 1 can fail in two different ways. First, that the mean can only shift by fixed amount at each step implies that the walk on $\omega$ can not go further than $$\frac{1}{\sqrt{e}} \sum_{k=0}^{\infty} \left(\frac{e-1}{e}\right)^{k/2} = \frac{1}{\sqrt{e} - \sqrt{e-1}} \approx 2.95 \qquad (8)$$

away from its initial position. Assuming $\mu_0$=0 and $\sigma_0$=1 correctly describe the true probability distribution from which $\omega$ are chosen, this corresponds to a failure probability of 0.3%. If one takes a prior that is too "tight" by a factor of about 20% (corresponding to a single step of the algorithm), then the failure probability due to finite support of the random walk can be as large as 1.8%. Thankfully, this is an easy failure modality to address, in that one can use an initial prior distribution with an artificially wider variance than the actual prior.

The other failure modality is more severe, in that the Gaussian approximation itself can fail. By contrast to rejection filtering and other such approaches, in embodiments of the disclosed random walk phase estimation, the variance is not selected based on the data itself, but based on an offline analytic computation. Thus, one desirably has a way to correct for approximation failures. For certain embodiments, this done by unwinding data records, returning to an earlier state of the random walk algorithm. In particular, since the data record uniquely describes the entire path of a random walker, one can step backwards along the history of a random walk.

To determine when one should unwind in this fashion, certain embodiments perform additional measurements whose outcomes can be accurately predicted if the approximation is still accurate. Choosing $\omega_{inv}$=$\mu$ and t=$\tau_{check}/\sigma$ for a scale parameter $\tau_{check}$>0, one can obtain that the probability of a 0 outcome is $$Pr(0; \mu, \tau_{check}/\sigma = \int Pr(0 | \omega; \mu, \tau_{check}/\sigma)Pr(\omega)d\omega \qquad (9a)$$

$$= \frac{1}{2}(1 + e^{-\tau_{check}^2/2}), \qquad (9b)$$

where Pr($\omega$) is assumed to be the normal distribution with mean $\mu$ and variance $\sigma^2$ as per the Gaussianity assumption. For $\tau_{check}$=1, this corresponds to a false negative rate (that is, inferring the approximation has failed when it has not) of approximately 19.6%, while $\tau_{check}$=$10^{-2}$ gives a false negative rate of 0.002%. The unwinding is listed together with the original random walk in Algorithm 2.

Notably, both the consistency check data and the unwound data are still useful data. In situations where the data can be efficiently recorded for later use, the entire data record including all unwound data and consistency checks may be used in postprocessing to verify that the estimate derived from the random walk is feasible. In the numerical results presented in Section IV, the example of particle filtering is used to perform postprocessing using the QInfer software library.

---

Algorithm 1 Basic random walk phase estimation algorithm.

--- function RANDOMWALKPHASEEST($\mu_0$, $\sigma_0$)
  ■ Arguments
    $\mu_0$: initial mean
    $\sigma_0$: initial standard deviation
  ■ Initialization
    $\mu \leftarrow \mu_0$
    $\sigma \leftarrow \sigma_0$
  ■ Main body
  for $i_{exp} \in \{0, 1, \ldots n_{exp} - 1\}$ do
    $\omega_{inv} \leftarrow \mu - \pi\sigma/2$
    $t \leftarrow 1/\sigma$
    Sample a datum d from Pr(d = 0|$\omega;\omega_{inv}$, t) = $\cos^2(t(\omega - \omega_{inv})/2)$.
    if d = 0 then
      $\mu \leftarrow \mu + \sigma/\sqrt{e}$
    else
      $\mu \leftarrow \mu - \sigma/\sqrt{e}$
    $\sigma \leftarrow \sigma \sqrt{(e-1)/e}$
  ■ Final estimate
  return $\hat{\omega} \leftarrow \mu$

---

Algorithm 2 Random walk phase estimation algorithm with consistency checks and data unwinding.

--- function RANDOMWALKPHASEEST( $\mu_0$, $\sigma_0$, $\tau_{check}$, $n_{unwind}$ )
  ■ Arguments
    $\mu_0$: initial mean
    $\sigma_0$: initial standard deviation
    $\tau_{check}$: consistency check scale
    $n_{unwind}$: number of unwinding steps
  ■ Initialization
    $\mu \leftarrow \mu_0$
    $\sigma \leftarrow \sigma_0$
    D $\leftarrow$ a stack of Boolean values.
  ■ Main body
  for $i_{exp} \in \{0, 1, \ldots n_{exp} - 1\}$ do
    $\omega_{inv} \leftarrow \mu - \pi\sigma/2$
    $t \leftarrow 1/\sigma$
    Sample a datum d from Pr(d = 0|$\omega;\omega_{inv}$, t) = $\cos^2(t(\omega - \omega_{inv})/2)$.
    Push d onto D.

-continued

Algorithm 2 Random walk phase estimation algorithm
with consistency checks and data unwinding.

```
    if d = 0 then
        μ ← μ + σ/√e
    else
        μ ← μ − σ/√e
    σ ← σ√(e −1)/e
    ■ Data unwinding
    if n_unwind > 0 then
        // Perform a consistency check; d' = 0 is most probable if
the approximation is correct.
        Sample a datum d' from Pr(d' = 0|ω; μ, τ_check/σ) =
cos²(τ_check/σ(ω − μ)/2).
        // Keep unwinding until the consistency check passes.
        while d' = 1 do
            for i_unwind ∈ {0, . . . , n_unwind − 1} do
                σ ← σ√e/(e −1)
                if D is not empty then  // Only shift μ backwards
when actual data was unwound.
                    d ← pop D
                    if d = 0 then
                        μ ← μ − σ/√e
                    else
                        μ ← μ + σ/√e
            // Perform a new consistency check.
            Sample a datum d' from Pr(d' = 0|ω; μ, τ_check/σ) =
cos²(τ_check/σ(ω− μ)/2).
    ■ Final estimate
    return ω̂ ← μ
```

IV. Further Analyses and Embodiments

A. Introduction

Figure 2:
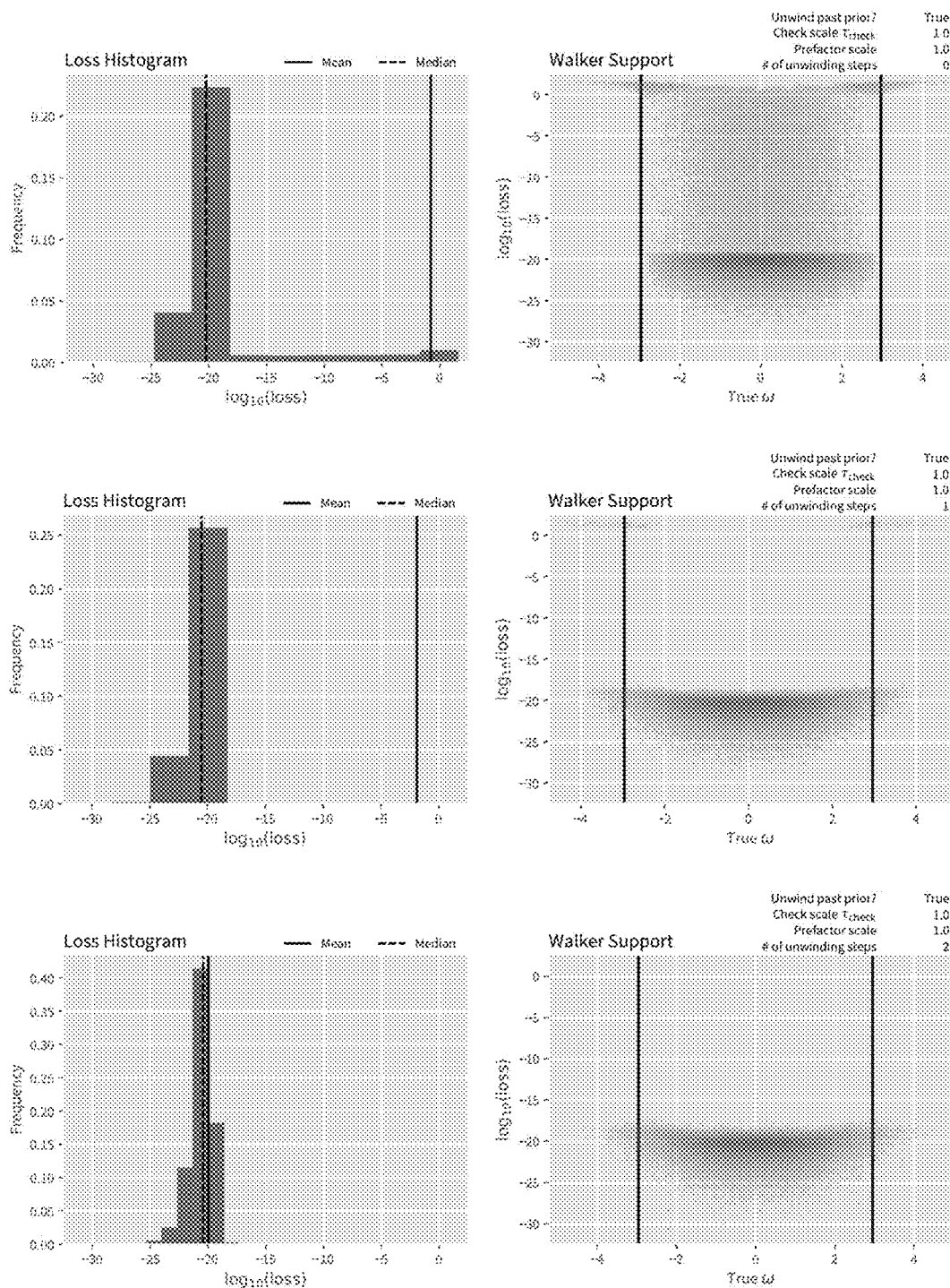
FIG. 2 is a set of graphs in which results are presented of an algorithm with unwinding steps that can continue backwards past the initial prior.

FIG. 2 is a set 200 of graphs in which results are presented of using Algorithm 2 with unwinding steps that can continue backwards past the initial prior. In particular, the graphs in FIG. 2 show histograms over log-losses for many different trials, compared to the mean loss (Bayes risk) and the median loss. The right column shows of FIG. 2 shows the log-loss versus the true value of ω, compared with the finite range (thick lines) in which each walker can explore. The top row of FIG. 2 illustrates trials that are run using the basic approach of Algorithm 1. The middle of row of FIG. 2 illustrates trials that are run using one unwinding step, as in Algorithm 2. And the bottom row of FIG. 2 illustrates trials that are run using two unwinding steps, as in Algorithm 2.

Figure 3:
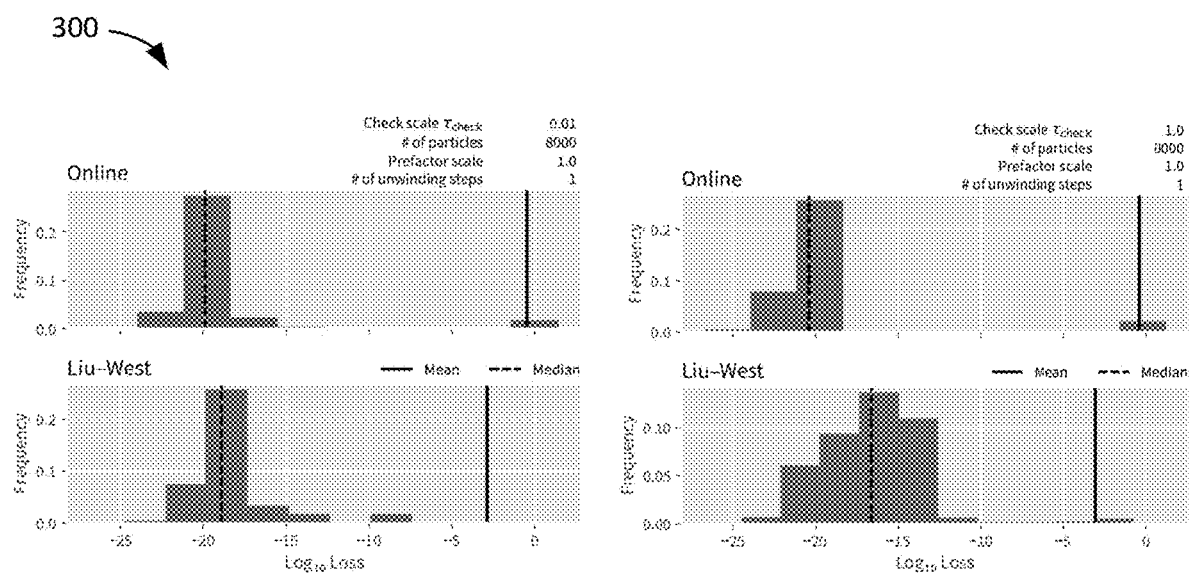
FIG. 3 is a set of graphs showing histograms over log-losses for many different trials.

Still further, FIG. 3 is a set 300 of graphs showing histograms over log-losses for many different trials, using Algorithm 2 with $n_{unwind}=1$. The bottom row shows histograms over log-losses for the same trials as in the top row, but using particle filtering with Liu-West resampling to incorporate consistency check and unwound data.

In this Appendix, the significance of this rule is underscored to allow the random walk to exceed the finite constraints of the basic walk presented Algorithm 1 by repeating the previous analysis with unwinding on actual data only.

Figure 4:
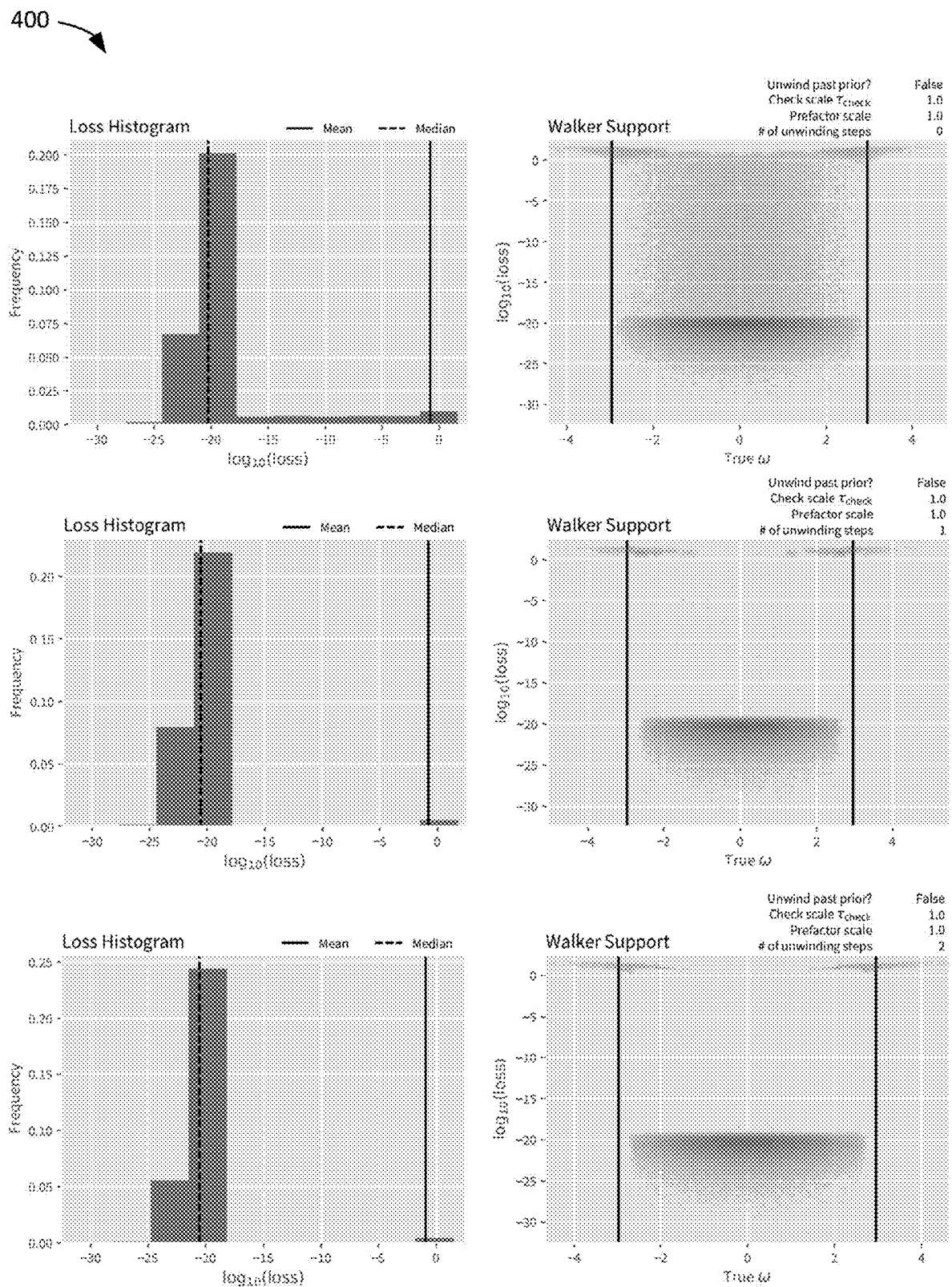
FIG. 4 is a set of graphs that show histograms over log-losses for many different trials using actual data only, compared to the mean loss (Bayes risk) and the median loss.

That is, in the results presented within FIG. 4, if an unwinding step would pop an empty stack D, then the unwinding step is aborted instead.

In particular, FIG. 4 is a set 400 of graphs that show histograms over log-losses for many different trials using actual data only, compared to the mean loss (Bayes risk) and the median loss. The right column shows of FIG. 4 shows the log-loss versus the true value of w, compared with the finite range (thick lines) in which each walker can explore. The top row of FIG. 4 illustrates trials that are run using the basic approach of Algorithm 1. The middle of row of FIG. 4 illustrates trials that are run using one unwinding step, as in Algorithm 2. And the bottom row of FIG. 4 illustrates trials that are run using two unwinding steps, as in Algorithm 2.

Figure 5:
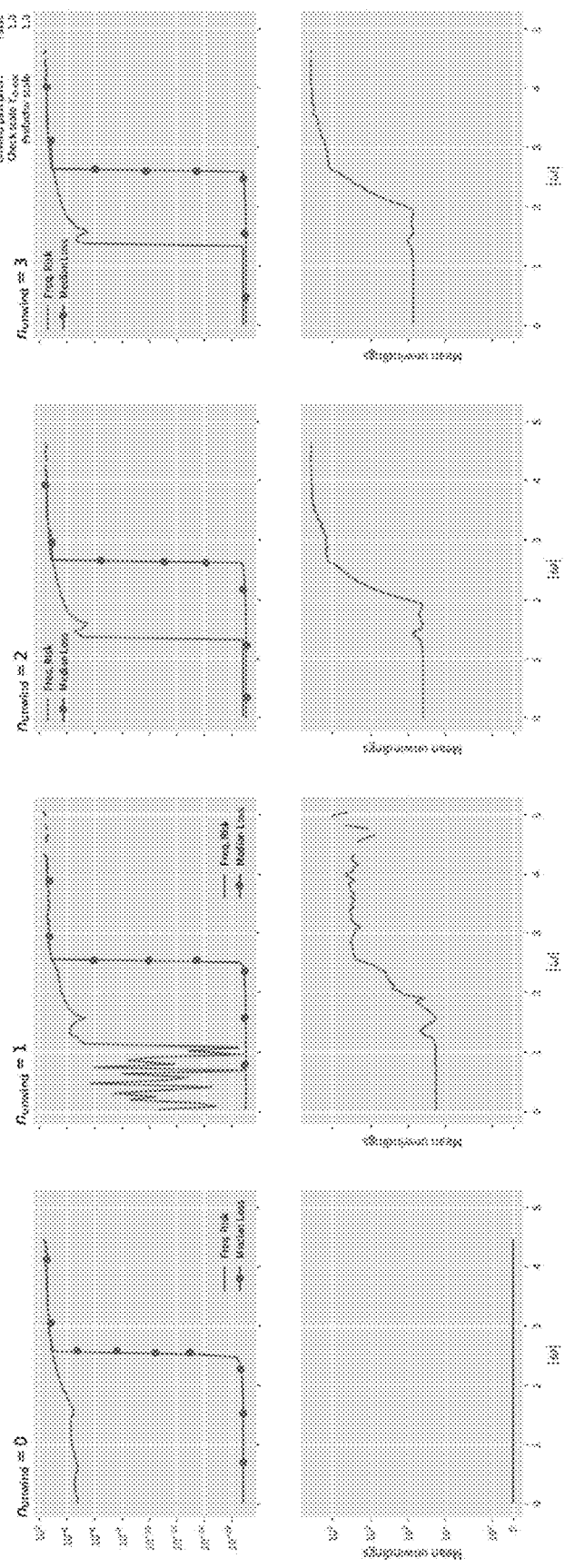
FIGS. 5 and 6 are graphs showing results where the frequentist risk is considered rather than the traditional Bayes risk.
Figure 6:
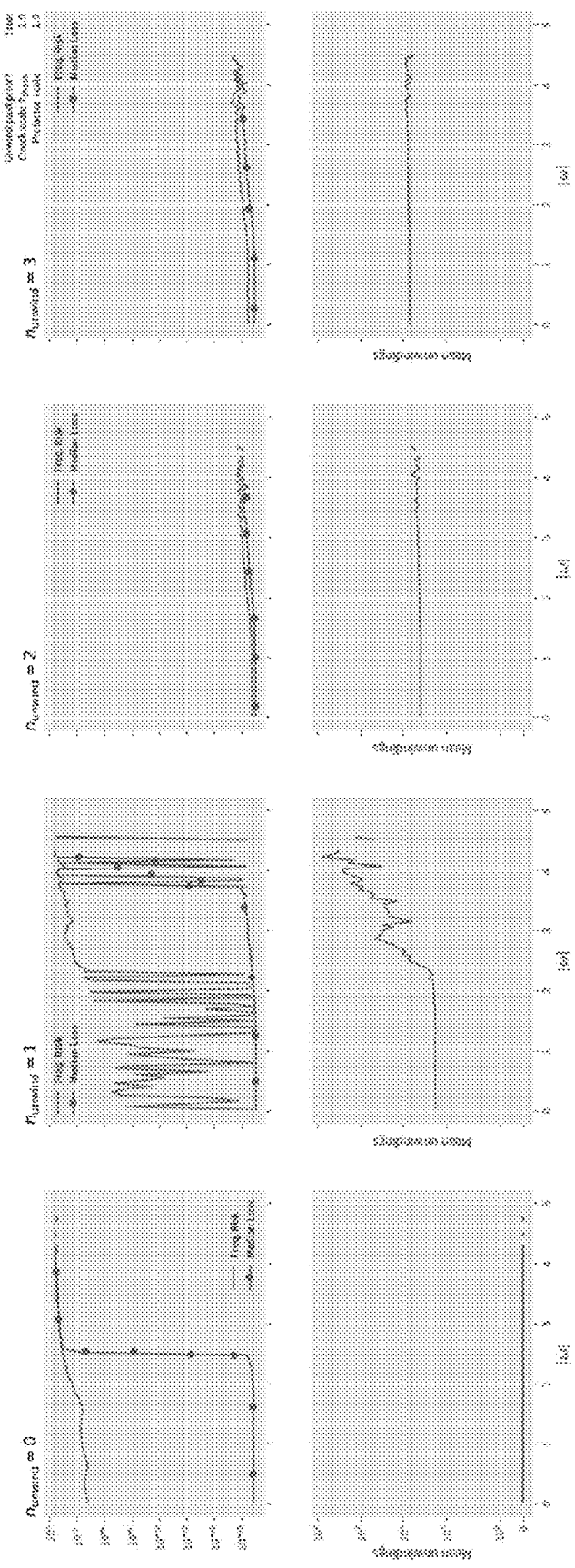

It is noted that the constrained unwinding, while still an improvement over the initial version of Algorithm 1, does not adequately deal with the effects of the finite support of the basic walk. This observation is underscored by the results presented in graphs 500 and 600 of FIGS. 5 and 6, where the frequentist risk is considered rather than the traditional Bayes risk. In particular, the top sections of FIGS. 5 and 6 show results for unwinding constrained by an initial prior, and the bottom section shows results of unwinding as described in Algorithm 2. The top row of each section shows the frequentist risk and median loss as a function of |ω|, the absolute value of the true ω used to generate data in each trial, and the bottom row of each section shows the median number of unwinding steps taken to accept 100 experiments. The columns in FIGS. 5 and 6 show the different numbers of unwinding steps allowed.

Concretely, the frequentist risk is defined as the average loss that incurred by an estimation when the true value of ω is fixed, $R(\hat{\omega},\omega):=\mathbb{E}_D[(\hat{\omega}-\omega)^2]$. It is then observed that without allowing the unwinding step to proceed backwards from the initial prior, the frequentist risk suddenly worsens by approximately $10^{20}$ when the finite extent of the random walk begins to dominate.

B. Decision Theoretic Bounds

In this disclosure, the disclosed algorithm is expressed as approximating the Bayesian mean estimator (BME) $\hat{\omega}_{BME}(D) := \mathbb{E}[\omega|D]$. This choice is motivated by a decision theoretic argument, in which one penalizes an estimator by a particular amount $L(\hat{\omega}(D),\omega)$ for returning a particular estimate $\hat{\omega}(D)$ when the true value of the parameter of interest is ω. A function L which one can use to assign such penalties is called a loss function; as described in the main body, the quadratic loss $L_Q(\hat{\omega}(D)-\omega) := (\hat{\omega}(D)-\omega)^2$ is a particularly useful and broadly applicable loss function. For purposes of this discussion, the subscript Q is dropped when it is clear from context that the discussion is referring to this choice.

In any case, once one adopts such a loss function, one can then reason about the average loss incurred by a particular estimator. In particular, the Bayes risk r is defined as the expected loss over all hypotheses ω∼π drawn from a prior π and over all data sets D. That is, $$r(\hat{\omega}) := \mathbb{E}_{\omega \sim \pi, D}[L(\hat{\omega}(D),\omega)]. \quad (10)$$

The BME minimizes the Bayes risk for any loss function is of the form $$L(\hat{\omega}(D), \omega) = F(\hat{\omega}(D)) - F(\omega) - \left(\frac{d}{d\omega}F(\omega)\right)(\hat{\omega} - \omega)$$

for a convex function F. This holds for the quadratic loss, as well as a number of other important examples such as the Kullback-Leibler divergence.

Having thus argued that embodiments of the disclosed approach are approximately optimal for the Bayes risk, one may then be interested in how well the disclosed algorithm approximately achieves the Bayes risk. To address this, it is noted that the van Trees inequality lower bounds the Bayes risk achievable by any estimator ω̂ as $$r(\hat{\omega}) \geq \frac{1}{\mathbb{E}_{\omega \sim \pi}[I(\omega)] + I_0}, \quad (11)$$

where $$I(\omega) := \mathbb{E}_D\left[\left(\frac{d}{d\omega}\log Pr(D\mid\omega)\right)^2\right]$$

is the usual Fisher information, and where $$I_0 := \mathbb{E}_{\omega\sim\pi}\left[\left(\frac{d}{d\omega}\log\pi(\omega)\right)^2\right]$$

is correction for the information provided by the prior distribution π. Thus, the van Trees inequality can be thought of as a correction to the traditional Cramér-Rao bound for the effects of prior information. Whereas the Cramér-Rao bound only holds for unbiased estimators, the BME is asymptotically unbiased but may in general be biased for a finite-sized data set.

In the case that π is a normal distribution $\mathcal{N}$ (0,1), however, the correction $I_0$ for the bias introduced by the prior distribution is identically zero, such that the van Trees and Cramér-Rao bounds coincide. More generally, the set of true values ω for which the Cramér-Rao bound can be violated by a biased estimator approaches Lebesgue measure zero asymptotically with the number of observations $n_{exp}$, such that the Cramér-Rao bound is useful for characterizing the performance of biased estimators such as the BME.

Applying this bound to Algorithm 2, it is noted that the experiments chosen by the algorithm are deterministic unless the unwinding step proceeds backwards from the initial prior. Thus, the Cramér-Rao and hence the van Trees inequalities can be calculated explicitly for the particular experimental choices made by Algorithm 2, yielding that $$r(\omega) \geq \frac{1}{\sum_{i_{exp}=0}^{n_{exp}-1}\left(\frac{e}{e-1}\right)^{i_{exp}}} = \left([e-1]\left[\frac{e}{e-1}\right]^{n_{exp}}\right)^{-1}, \quad (12)$$

where $I(\omega)=\Sigma_i t_i^2$. For $n_{exp}=100$, $r(\hat{\omega}) \gtrsim 7\times 10^{-21}$.

Notably, the van Trees inequality holds in expectation, such that the loss in any particular experiment can be significantly better than (12). Moreover, the consistency checks utilized by Algorithm 2 provide additional data not included in the bound given by (12), such that the disclosed algorithms violate the van Trees inequality evaluated only at the accepted measurement results. In that sense, the disclosed algorithms can be thought of as heuristics for importance sampling from amongst the data, such that the usual discussions of optimality and postselection apply.

V. Example Computing Environments

Figure 7:
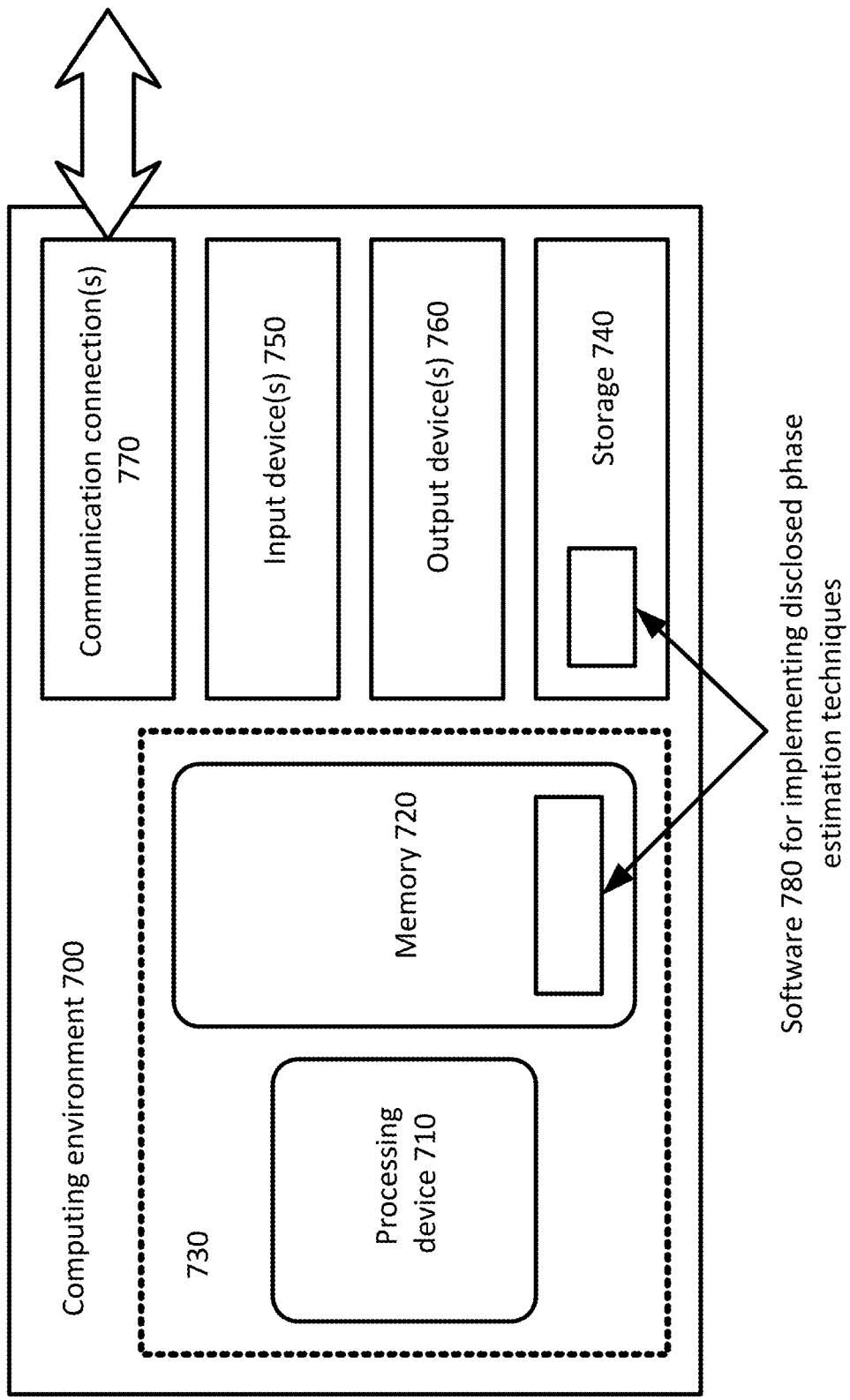
FIG. 7 illustrates a generalized example of a suitable classical computing environment in which several of the described embodiments can be implemented.

FIG. 7 illustrates a generalized example of a suitable classical computing environment 700 in which several of the described embodiments can be implemented. The computing environment 700 is not intended to suggest any limitation as to the scope of use or functionality of the disclosed technology, as the techniques and tools described herein can be implemented in diverse general-purpose or special-purpose environments that have computing hardware.

With reference to FIG. 7, the computing environment 700 includes at least, one processing device 710 and memory 720. In FIG. 7, this most basic configuration 730 is included within a dashed line. The processing device 710 (e.g., a CPU or microprocessor) executes computer-executable instructions. In a multi-processing system, multiple processing devices execute computer-executable instructions to increase processing power. The memory 720 may be volatile memory (e.g., registers, cache, RAM, DRAM, SRAM), non-volatile memory (e.g., ROM, EEPROM, flash memory), or some combination of the two. The memory 720 stores software 780 implementing tools for performing any of the phase estimation techniques as described herein. The memory 720 can also store software 780 for synthesizing, generating, or compiling quantum circuits resulting from and/or supported by the phase estimation techniques as described herein.

The computing environment can have additional features. For example, the computing environment 700 includes storage 740, one or more input devices 750, one or more output devices 760, and one or more communication connections 770. An interconnection mechanism (not shown), such as a bus, controller, or network, interconnects the components of the computing environment 700. Typically, operating system software (not shown) provides an operating environment for other software executing in the computing environment 700, and coordinates activities of the components of the computing environment 700.

The storage 740 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 700. The storage 740 can also store instructions for the software 780 implementing any of the disclosed phase estimation techniques. The storage 740 can also store instructions for the software 780 for generating and/or synthesizing any of the described techniques, systems, or reversible circuits.

The input device(s) 750 can be a touch input device such as a keyboard, touchscreen, mouse, pen, trackball, a voice input device, a scanning device, or another device that provides input to the computing environment 700. The output device(s) 760 can be a display device (e.g., a computer monitor, laptop display, smartphone display, tablet display, netbook display, or touchscreen), printer, speaker, or another device that provides output from the computing environment 700.

The communication connection(s) 770 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, phase estimation techniques, circuit design techniques, or compilation/synthesis techniques can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 720 and/or storage 740, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 8:
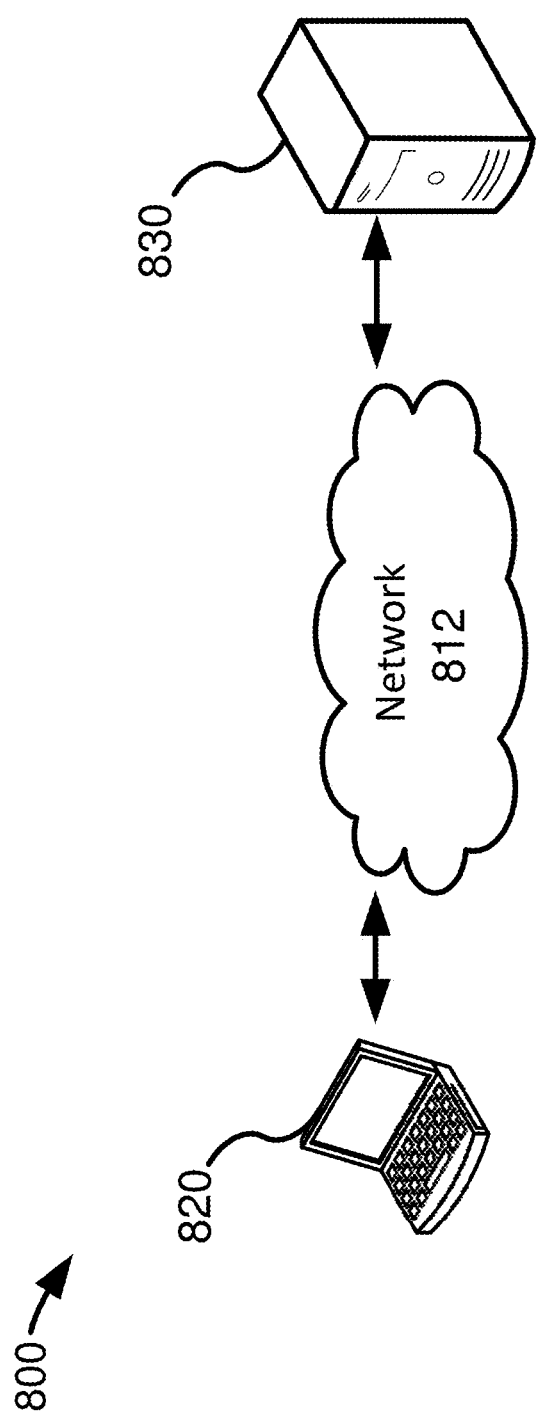
FIG. 8 is an example of a possible network topology (e.g., a client-server network) for implementing a system according to the disclosed technology.

An example of a possible network topology 800 (e.g., a client-server network) for implementing a system according to the disclosed technology is depicted in FIG. 8. Networked computing device 820 can be, for example, a computer running a browser or other software connected to a network 812. The computing device 820 can have a computer architecture as shown in FIG. 7 and discussed above. The computing device 820 is not limited to a traditional personal computer but can comprise other computing hardware configured to connect to and communicate with a network 812 (e.g., smart phones, laptop computers, tablet computers, or other mobile computing devices, servers, network devices, dedicated devices, and the like). Further, the computing device 820 can comprise an FPGA or other programmable logic device. In the illustrated embodiment, the computing device 820 is configured to communicate with a computing device 830 (e.g., a remote server, such as a server in a cloud computing environment) via a network 812. In the illustrated embodiment, the computing device 820 is configured to transmit input data to the computing device 830, and the computing device 830 is configured to implement a phase estimation technique according to any of the disclosed embodiments and/or a circuit generation or compilation/synthesis methods for generating quantum circuits based on or in conjunction with any of the phase estimation techniques disclosed herein. The computing device 830 can output results to the computing device 820. Any of the data received from the computing device 830 can be stored or displayed on the computing device 820 (e.g., displayed as data on a graphical user interface or web page at the computing devices 820). In the illustrated embodiment, the illustrated network 812 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 812 can be the Internet or a similar public network and operate using an appropriate protocol (e.g., the HTTP protocol).

Figure 9:
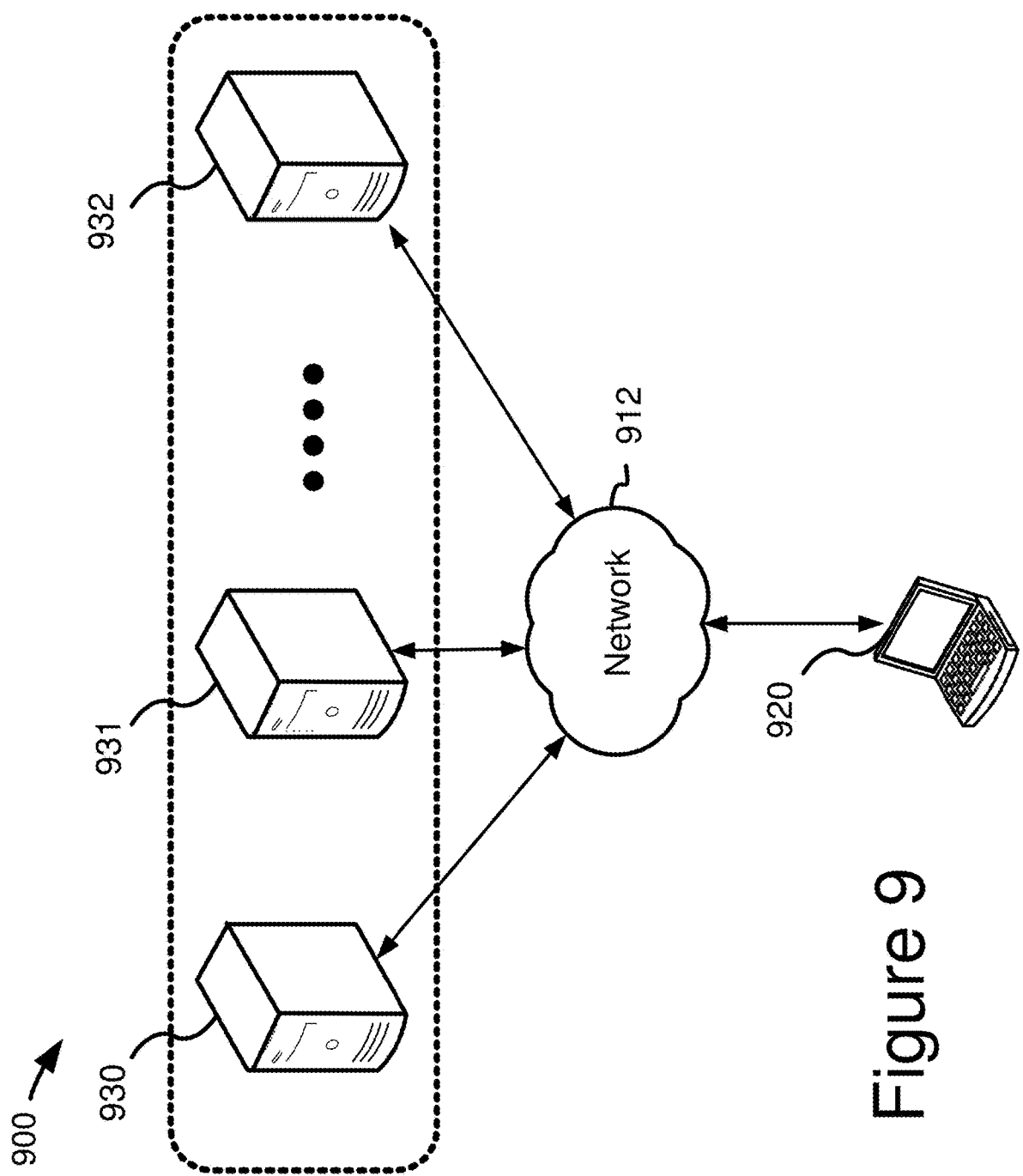
FIG. 9 is another example of a possible network topology (e.g., a distributed computing environment) for implementing a system according to the disclosed technology is depicted.

Another example of a possible network topology 900 (e.g., a distributed computing environment) for implementing a system according to the disclosed technology is depicted in FIG. 9. Networked computing device 920 can be, for example, a computer running a browser or other software connected to a network 912. The computing device 920 can have a computer architecture as shown in FIG. 7 and discussed above. In the illustrated embodiment, the computing device 920 is configured to communicate with multiple computing devices 930, 931, 932 (e.g., remote servers or other distributed computing devices, such as one or more servers in a cloud computing environment) via the network 912. In the illustrated embodiment, each of the computing devices 930, 931, 932 in the computing environment 900 is used to perform at least a portion of a phase estimation process and/or circuit generation or synthesis/compilation process. In other words, the computing devices 930, 931, 932 form a distributed computing environment in which the phase estimation and/or generation/compilation/synthesis processes are shared across multiple computing devices. The computing device 920 is configured to transmit input data to the computing devices 930, 931, 932, which are configured to distributively implement such as process, including performance of any of the disclosed methods or creation of any of the disclosed circuits, and to provide results to the computing device 920. Any of the data received from the computing devices 930, 931, 932 can be stored or displayed on the computing device 920 (e.g., displayed as data on a graphical user interface or web page at the computing devices 920). The illustrated network 912 can be any of the networks discussed above with respect to FIG. 8.

Figure 10:
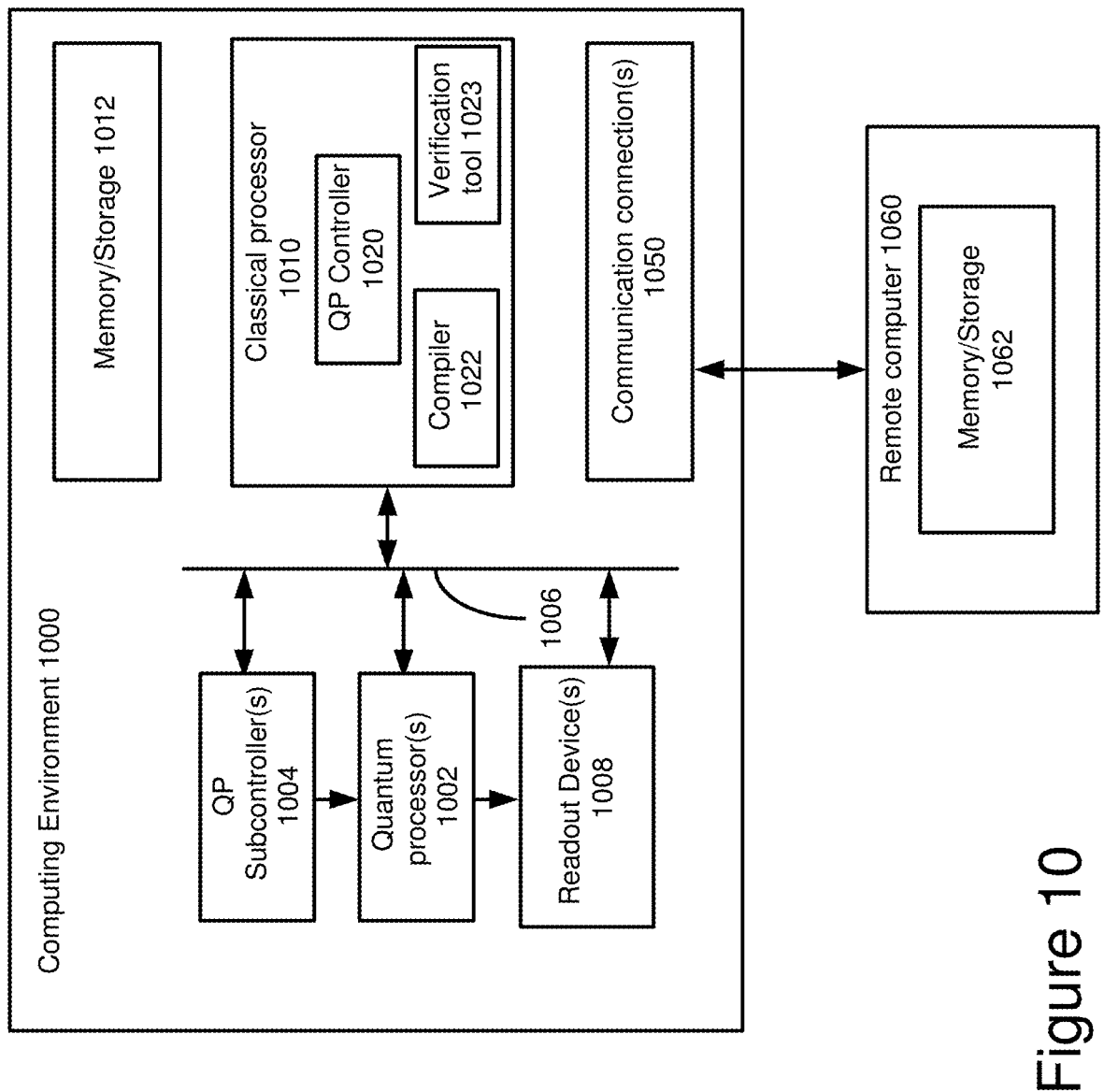
FIG. 10 is an exemplary system for implementing the disclosed technology that includes a classical computing environment and a quantum computing environment.

With reference to FIG. 10, an exemplary system for implementing the disclosed technology includes computing environment 1000. In computing environment 1000, a compiled quantum computer circuit description (including quantum circuits resulting from and/or supported by any of the phase estimation techniques as disclosed herein) can be used to program (or configure) one or more quantum processing units such that the quantum processing unit(s) implement the circuit described by the quantum computer circuit description.

The environment 1000 includes one or more quantum processing units 1002 and one or more readout device(s) 1008. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 1006 at the control of quantum processor controller 1020. The quantum processor controller (QP controller) 1020 can operate in conjunction with a classical processor 1010 (e.g., having an architecture as described above with respect to FIG. 7) to implement the desired quantum computing process. In the illustrated example, the QP controller 1020 further implements the desired quantum computing process via one or more QP subcontrollers 1004 that are specially adapted to control a corresponding one of the quantum processor(s) 1002. For instance, in one example, the quantum controller 1020 facilitates implementation of the compiled quantum circuit by sending instructions to one or more memories (e.g., lower-temperature memories), which then pass the instructions to low-temperature control unit(s) (e.g., QP subcontroller(s) 1004) that transmit, for instance, pulse sequences representing the gates to the quantum processing unit(s) 1002 for implementation. In other examples, the QP controller(s) 1020 and QP subcontroller(s) 1004 operate to provide appropriate magnetic fields, encoded operations, or other such control signals to the quantum processor(s) to implement the operations of the compiled quantum computer circuit description. The quantum controller(s) can further interact with readout devices 1008 to help control and implement the desired quantum computing process (e.g., by reading or measuring out data results from the quantum processing units once available, etc.)

With reference to FIG. 10, compilation is the process of translating a high-level description of a quantum algorithm into a quantum computer circuit description comprising a sequence of quantum operations or gates, which can include the circuits as disclosed herein. The compilation can be performed by a compiler 1022 using a classical processor 1010 (e.g., as shown in FIG. 7) of the environment 1000 which loads the high-level description from memory or storage devices 1012 and stores the resulting quantum computer circuit description in the memory or storage devices 1012.

In other embodiments, compilation and/or verification can be performed remotely by a remote computer 1060 (e.g., a computer having a computing environment as described above with respect to FIG. 7) which stores the resulting quantum computer circuit description in one or more memory or storage devices 1062 and transmits the quantum computer circuit description to the computing environment 1000 for implementation in the quantum processing unit(s) 1002. Still further, the remote computer 1000 can store the high-level description in the memory or storage devices 1062 and transmit the high-level description to the computing environment 1000 for compilation and use with the quantum processor(s). In any of these scenarios, results from the computation performed by the quantum processor(s) can be communicated to the remote computer after and/or during the computation process. Still further, the remote computer can communicate with the QP controller(s) 1020 such that the quantum computing process (including any compilation, verification, and QP control procedures) can be remotely controlled by the remote computer 1060. In general, the remote computer 1060 communicates with the QP controller(s) 1020, compiler/synthesizer 1022, and/or verification tool 1023 via communication connections 1050.

In particular embodiments, the environment 1000 can be a cloud computing environment, which provides the quantum processing resources of the environment 1000 to one or more remote computers (such as remote computer 1060) over a suitable network (which can include the internet).

VI. Example General Embodiments

Further details for exemplary non-limiting embodiments of the disclosed tools and techniques are shown in FIGS. 11-14.

Figure 11:
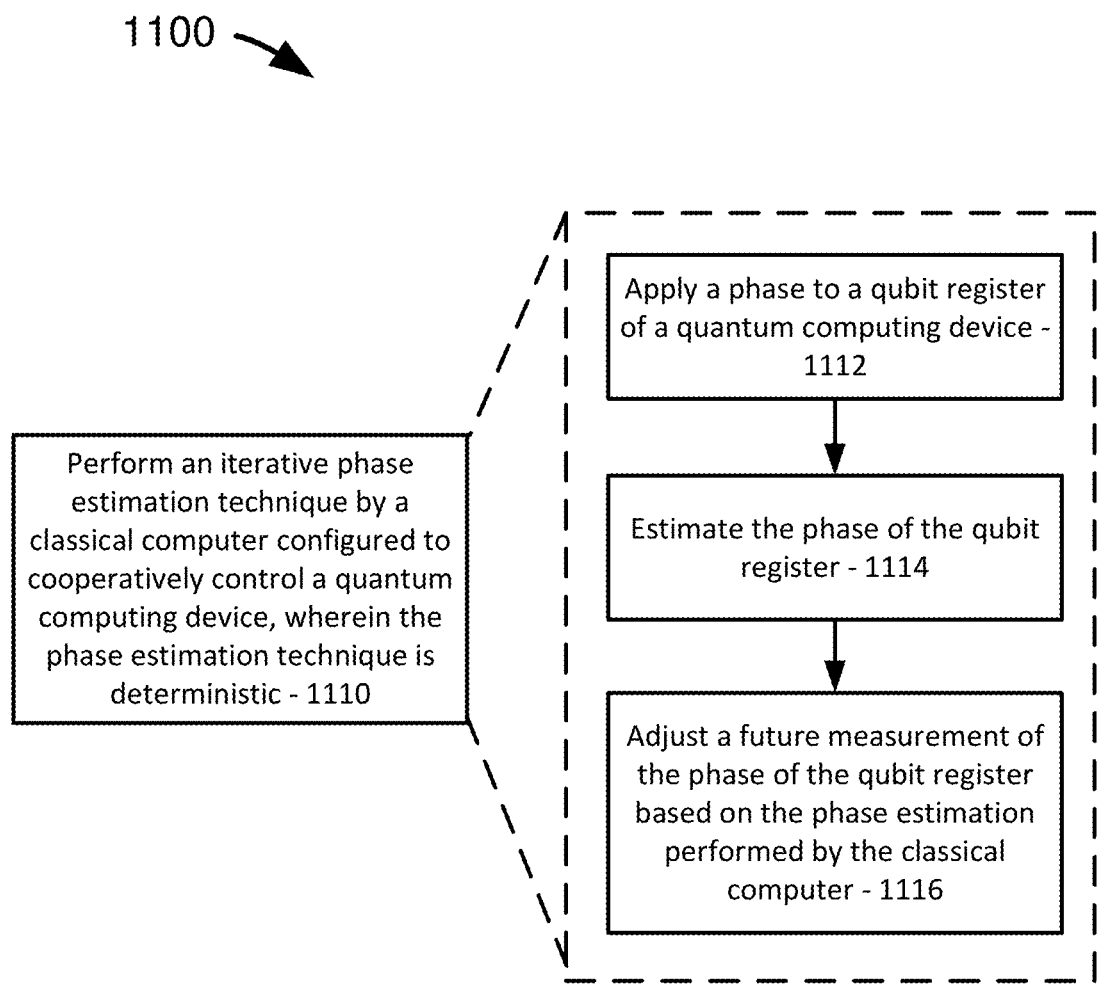
FIG. 11 is a flowchart showing a generalized example embodiment for implementing an embodiment of the disclosed technology.

FIG. 11 is a flowchart 1100 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations.

At 1110, an iterative Heisenberg-limited phase estimation technique is performed in which the phase estimation is performed by a classical computer that is configured to cooperatively control a quantum computing device. Further, in this embodiment, the phase estimation technique is deterministic (e.g., comprises deterministically choosing experimental parameters). For instance, in certain embodiments, the phase estimation technique involves deterministically and adaptively choosing experiments while using a concise set of statistics to represent its current one or more estimates and/or uncertainties about the unknown phase. In some implementations the phase estimation technique is deterministically generated by choosing parameters (e.g., for a random walk approach) that yield optimal information under the assumption of a Gaussian prior. Further, in some implementations, the experimental parameters include the number of times the unitary operation is applied and/or other experimental parameters, based on (for example) the direction of each step in the algorithm is determined by data and prior experiments.

Further, in some embodiments, and as shown in FIG. 11, the iterative phase estimation technique comprises, applying (at 1112) a phase to a qubit register of a quantum computing device: estimating (at 1114) the phase of the qubit register; and adjusting (at 1116) a future measurement of the phase of the qubit register based on the phase estimation performed by the classical computer.

Additionally, in some embodiments, the phase estimation technique is performed to determine eigenvalues of a unitary operator represented by a qubit of the quantum computing device. And, in certain embodiments, the phase estimation technique uses a random walk approach. The random walk approach can, for example, adjust an estimate of the posterior mean of the phase right or left based on a single measurement of the qubit register, and/or can adjust an estimation of a posterior mean of the phase upward or downward based on a single measurement of the qubit register.

Figure 12:
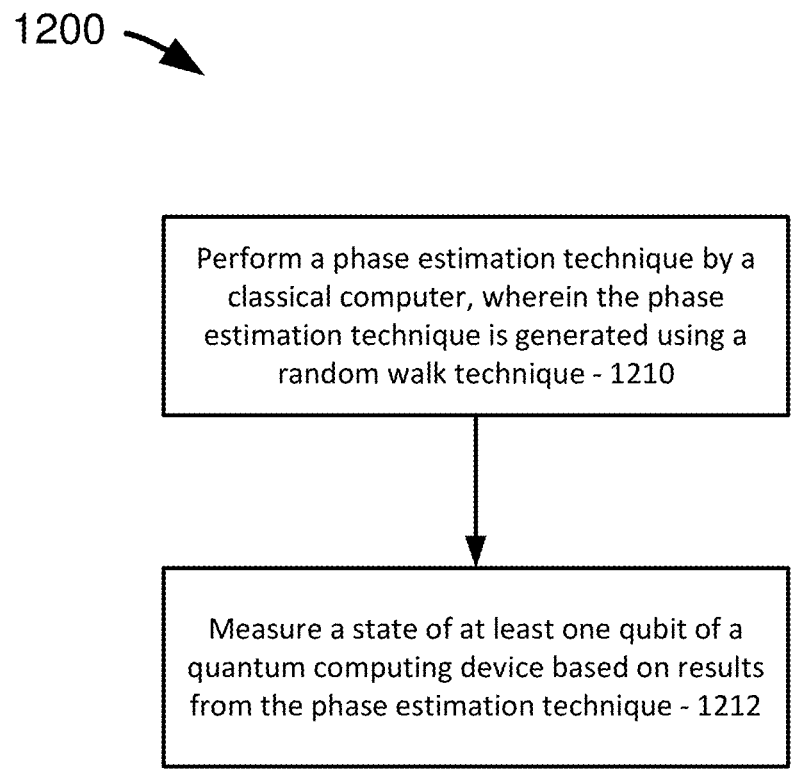
FIG. 12 is a flowchart showing another generalized example embodiment for implementing an embodiment of the disclosed technology.

FIG. 12 is a flowchart 1200 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations.

At 1210, a phase estimation technique is performed by a classical computer.

At 1212, a state of at least one qubit of a quantum computing device is measured based on results from the phase estimation technique.

Still further, in the illustrated embodiment, the classical computer is configured to cooperatively control a quantum computing device and generate a phase estimation using a random walk technique.

In some example implementations, a decision to adjust an estimate of the posterior mean of the phase is adjusted left or right based on a single experiment and/or an estimate of the posterior mean of the phase is adjusted up or down based on a single experiment. Further, in some implementations, the classical processing is performed by cryogenic hardware.

Figure 13:
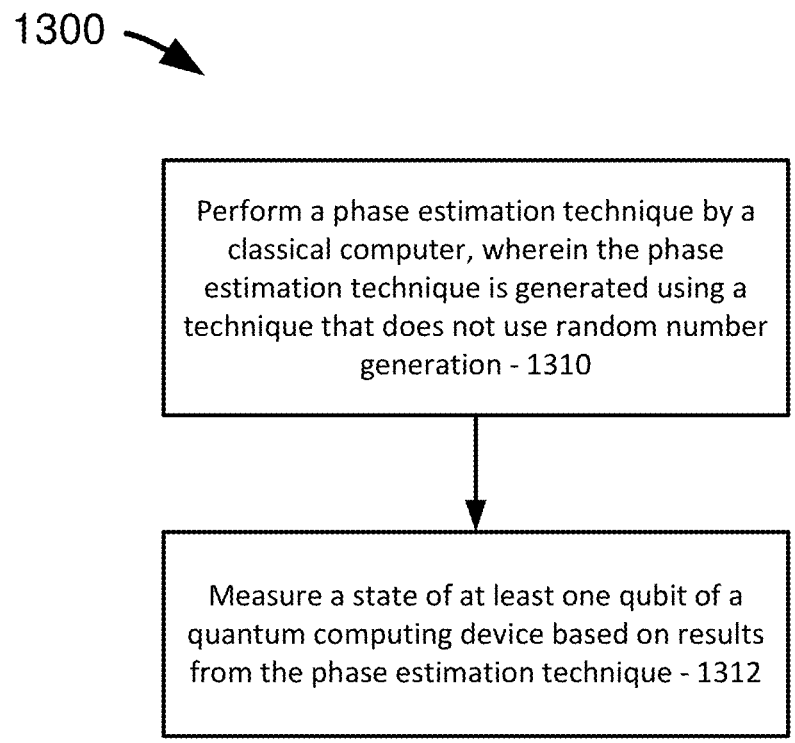
FIG. 13 is a flowchart showing a further generalized example embodiment for implementing an embodiment of the disclosed technology.

FIG. 13 is a flowchart 1300 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations.

At 1310, a phase estimation technique is performed by a classical computer.

At 1312, a state of at least one qubit of a quantum computing device is measured based on results from the phase estimation technique.

In the illustrated embodiment, the classical computer is configured to cooperatively control a quantum computing device and perform the measurement. Still further, in the illustrated embodiment, the phase estimation is generated using a technique without random number generation (e.g., a non-random technique). In particular implementations, the phase estimation technique only stores a current best estimate of an eigenphase. Further, in some implementations, the classical processing is performed by cryogenic hardware.

Figure 14:
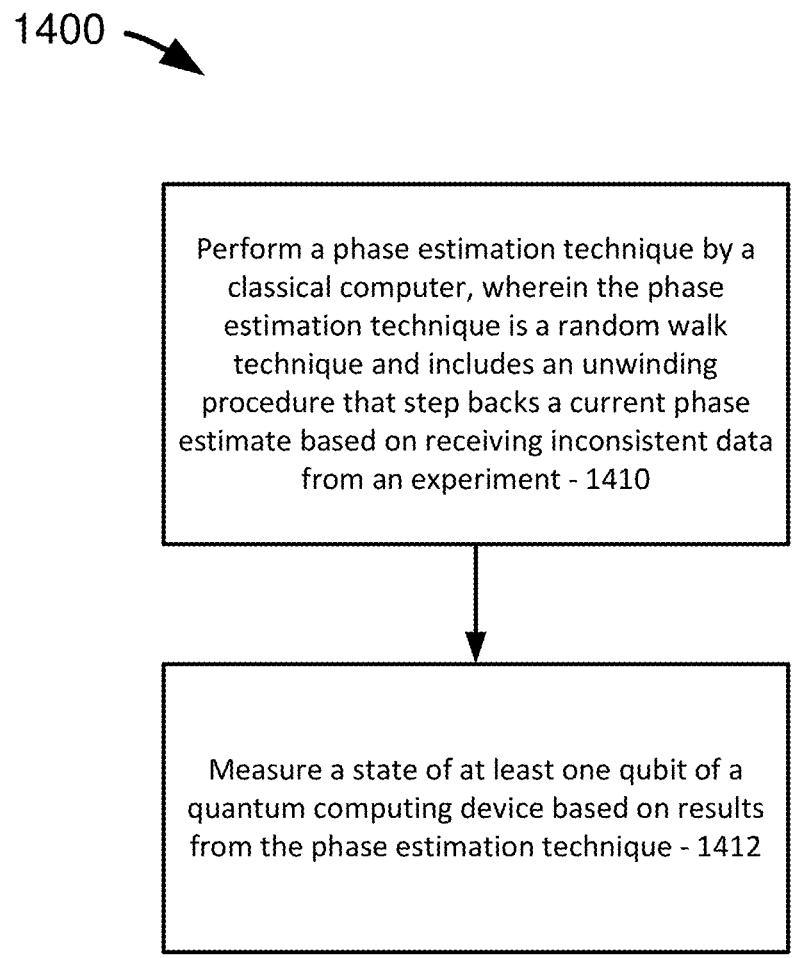
FIG. 14 is a flowchart showing yet another generalized example embodiment for implementing an embodiment of the disclosed technology.

FIG. 14 is a flowchart. 1400 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations.

At 1410, a phase estimation technique is performed by a classical computer.

At 1412, a state of at least one qubit of a quantum computing device is measured based on results from the phase estimation technique.

In the illustrated embodiment, the classical computer is configured to cooperatively control a quantum computing device and perform the measurement. Additionally, the phase estimation technique is a random walk technique and includes an unwinding procedure that step backs a current phase estimate based on receiving inconsistent data from an experiment. In particular implementations, the unwinding procedure reduces a mean error by restarting the procedure while retaining some information from at least one previous application of the method and/or using majority voting over different random answers. Further, in some implementations, the unwinding step causes the random walk technique to return to a location before a first datum was taken.

VII. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

The invention claimed is:

1. A method, comprising performing an iterative Heisenberg-limited phase estimation technique in which the phase estimation is performed by a classical computer that is configured to cooperatively control a quantum computing device, the iterative phase estimation technique comprising:
applying a phase to a qubit register of a quantum computing device;
estimating the phase of the qubit register; and
adjusting a future measurement of the phase of the qubit register based on the estimating of the phase performed by the classical computer;
wherein the phase estimation technique involves deterministically and adaptively choosing experimental parameters while using a concise set of statistics to represent its current one or more estimates and/or uncertainties about the unknown phase.

2. The method of claim 1, wherein the parameters for a walk are deterministically generated by choosing the parameters that yield optimal information under the assumption of a Gaussian prior.

3. The method of claim 1, wherein the phase estimation technique is performed to determine eigenvalues of a unitary operator represented by a qubit of the quantum computing device.

4. The method of claim 1, wherein the phase estimation technique uses a random walk approach.

5. The method of claim 4, wherein the random walk approach adjusts an estimate of the posterior mean of the phase right or left based on a single measurement of the qubit register.

6. The method of claim 4, wherein the random walk approach adjusts an estimate of the posterior mean of the phase upward or downward based on a single measurement of the qubit register.

7. A system, comprising:
a quantum computing device; and
a classical computing device in communication with the quantum computing device and adapted to perform the method of claim 1.

8. A method, comprising:
performing a phase estimation technique by a classical computer, the phase estimation technique comprising:
applying a phase to a qubit register of a quantum computing device;
estimating the phase of the qubit register; and
adjusting a future measurement of the phase of the qubit register based on the estimated phase; and
measuring a state of at least one qubit of the quantum computing device based on results from the phase estimation technique,
wherein the phase estimation technique is configured to cooperatively control a quantum computing device and generate a phase estimation using a random walk technique.

9. The method of claim 8, wherein a decision to adjust an estimate of the posterior mean of the phase is adjusted left or right based on a single experiment.

10. The method of claim 8, wherein a decision to adjust an estimate of the posterior mean of the phase is adjusted up or down based on a single experiment.

11. The method of claim 8, wherein the classical processing is performed by cryogenic hardware.

12. A system, comprising:
a quantum computing device configured to perform the measuring of claim 8; and
a classical computing device in communication with the quantum computing device and adapted to perform the phase estimation technique of claim 8.

13. A method, comprising:
performing a phase estimation technique by a classical computer, the phase estimation technique comprising:
applying a phase to a qubit register of a quantum computing device;
estimating the phase of the qubit register; and
adjusting a future measurement of the phase of the qubit register based on the estimated phase; and
measuring a state of at least one qubit of the quantum computing device based on results from the phase estimation technique,
wherein the classical computer is configured to cooperatively control the quantum computing device, and
wherein the phase estimation technique (a) does not use random number generation, or (b) is a random walk technique and includes an unwinding procedure that step backs a current phase estimate based on receiving inconsistent data from an experiment.

14. The method of claim 13, wherein the phase estimation technique does not use random number generation and only stores a current best estimate of an eigenphase.

15. The method of claim 14, wherein the classical portion of the method is performed by cryogenic hardware.

16. The method of claim 13, wherein the phase estimation technique is (b), and wherein the unwinding procedure reduces a mean error by restarting the procedure while retaining some information from at least one previous application of the method.

17. The method of claim 16, wherein the unwinding procedure reduces a mean error by using majority voting over different random answers.

18. The method of claim 16, wherein the unwinding step causes the random walk technique to return to a location before a first datum was taken.

19. A system, comprising:
   a quantum computing device configured to perform the measuring of claim 13; and
   a classical computing device in communication with the quantum computing device and adapted to perform the phase estimation technique of claim 13.

* * * * *